US010187320B2

(12) United States Patent
Van Heuklon et al.

(10) Patent No.: US 10,187,320 B2
(45) Date of Patent: Jan. 22, 2019

(54) TRANSFERRING WORKLOADS BETWEEN COMPUTING DEVICES IN A DISTRIBUTED COMPUTING SYSTEM

(71) Applicant: LENOVO ENTERPRISE SOLUTIONS (SINGAPORE) PTE. LTD., Singapore (SG)

(72) Inventors: Andrew T. Van Heuklon, Rochester, MN (US); Jeffery J. Van Heuklon, Rochester, MN (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 289 days.

(21) Appl. No.: 14/629,111

(22) Filed: Feb. 23, 2015

(65) Prior Publication Data

US 2016/0248696 A1  Aug. 25, 2016

(51) Int. Cl.
| | |
|---|---|
| G06F 15/173 | (2006.01) |
| H04L 12/917 | (2013.01) |
| H04L 29/08 | (2006.01) |
| H04W 4/80 | (2018.01) |

(52) U.S. Cl.
CPC ............ *H04L 47/76* (2013.01); *H04L 67/10* (2013.01); *H04L 67/1008* (2013.01); *H04W 4/80* (2018.02)

(58) Field of Classification Search
CPC ..... H04L 67/1008; H04L 47/70; H04L 47/76; H04L 67/1021; H04L 41/12; H04L 41/22; H04L 43/08; H04L 47/25; H04L 67/1031; H04L 67/125; G06F 9/505; G06F 11/3433; G06F 9/5083; G06F 11/2025
USPC ............... 709/203, 217, 223, 224, 226, 230; 455/41.1, 41.2
See application file for complete search history.

(56) References Cited

U.S. PATENT DOCUMENTS

| | | |
|---|---|---|
| 2008/0270564 A1 | 10/2008 | Rangegowda et al. |
| 2011/0070828 A1 | 3/2011 | Griffin et al. |
| 2011/0218730 A1* | 9/2011 | Rider ..................... G01C 21/00 701/533 |

(Continued)

FOREIGN PATENT DOCUMENTS

WO    WO 2006/095186 A1    9/2006

OTHER PUBLICATIONS

Biddle et al., "Migrating Virtual Machines Between Hosts", Red Hat Enterprise Virtualization 3.4 Administration Guide, Chapter 9.14, Jun. 2014, pp. 235-239, Red Hat Inc., USA, URL: https://access.redhat.com/documentation/en-US/Red_Hat_Enterprise_Virtualization/3.4/html/Administration_Guide/sect-Migrating_Virtual_Machines_Between_Hosts.html.

*Primary Examiner* — Dustin Nguyen
*Assistant Examiner* — Hao H Nguyen
(74) *Attorney, Agent, or Firm* — Brandon C. Kennedy; Philip L. Weinstein; Kennedy Lenart Spraggins LLP

(57) ABSTRACT

Transferring workloads between computing devices in a distributed computing system, including: receiving, by a mobile computing device via a proximity-based communications protocol, a first computing device identity; receiving, by the mobile computing device, information describing one or more workloads executing on the first computing device; identifying, by the mobile computing device, a second computing device in the distributed computing system that is capable of executing at least a portion of the one or more workloads executing on the first computing device; and initiating, by the mobile computing device, a transfer of at least a portion of the one or more workloads executing on the first computing device to the second computing device.

6 Claims, 5 Drawing Sheets

(56) References Cited

U.S. PATENT DOCUMENTS

| | | | |
|---|---|---|---|
| 2011/0319016 A1* | 12/2011 | Gormley | H04B 5/0031 455/41.1 |
| 2013/0290513 A1* | 10/2013 | Shikari | G06F 9/546 709/224 |
| 2014/0046618 A1* | 2/2014 | Arunachalam | G05B 19/0428 702/127 |
| 2014/0173336 A1* | 6/2014 | Bennah | G06F 11/2028 714/4.12 |
| 2014/0187153 A1 | 7/2014 | Zhu et al. | |
| 2015/0006705 A1* | 1/2015 | Antony | H04L 43/0882 709/224 |
| 2015/0058659 A1* | 2/2015 | Brundridge | G06F 11/2025 714/4.11 |
| 2015/0222329 A1* | 8/2015 | Ohren | H04B 5/0031 455/41.1 |
| 2016/0087909 A1* | 3/2016 | Chatterjee | H04L 47/70 709/226 |
| 2016/0335421 A1* | 11/2016 | Savage | G06F 21/105 |

\* cited by examiner

TRANSFERRING WORKLOADS BETWEEN COMPUTING DEVICES IN A DISTRIBUTED COMPUTING SYSTEM

BACKGROUND OF THE INVENTION

Field of the Invention

The field of the invention is data processing, or, more specifically, methods, apparatus, and products for transferring workloads between computing devices in a distributed computing system.

Description of Related Art

Modern computing systems often include a plurality of computing devices, such as servers, that collectively provide processing capabilities. Such computing devices may reside at a centralized location such as a data center. When a system administrator is physically located in the data center and needs to move virtual servers or workloads from a first physical server to a second physical server, the administrator must log into a system management console, identify the first physical server by name, know the location of the first physical server, and perform a series of steps to migrate the virtual servers or workloads. If the system administrator is physically standing in front of the first physical server, the system administrator may not be able to identify the first physical server by name and would not be able to perform any administrative actions. This can be problematic if the system administrator knows that the virtual servers and workloads need to be quickly moved from the first physical server, for example, because smoke is starting to come out of the first physical server.

SUMMARY OF THE INVENTION

Methods, apparatuses, and products for transferring workloads between computing devices in a distributed computing system, including: receiving, by a mobile computing device via a proximity-based communications protocol, a first computing device identity; receiving, by the mobile computing device, information describing one or more workloads executing on the first computing device; identifying, by the mobile computing device, a second computing device in the distributed computing system that is capable of executing at least a portion of the one or more workloads executing on the first computing device; and initiating, by the mobile computing device, a transfer of at least a portion of the one or more workloads executing on the first computing device to the second computing device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
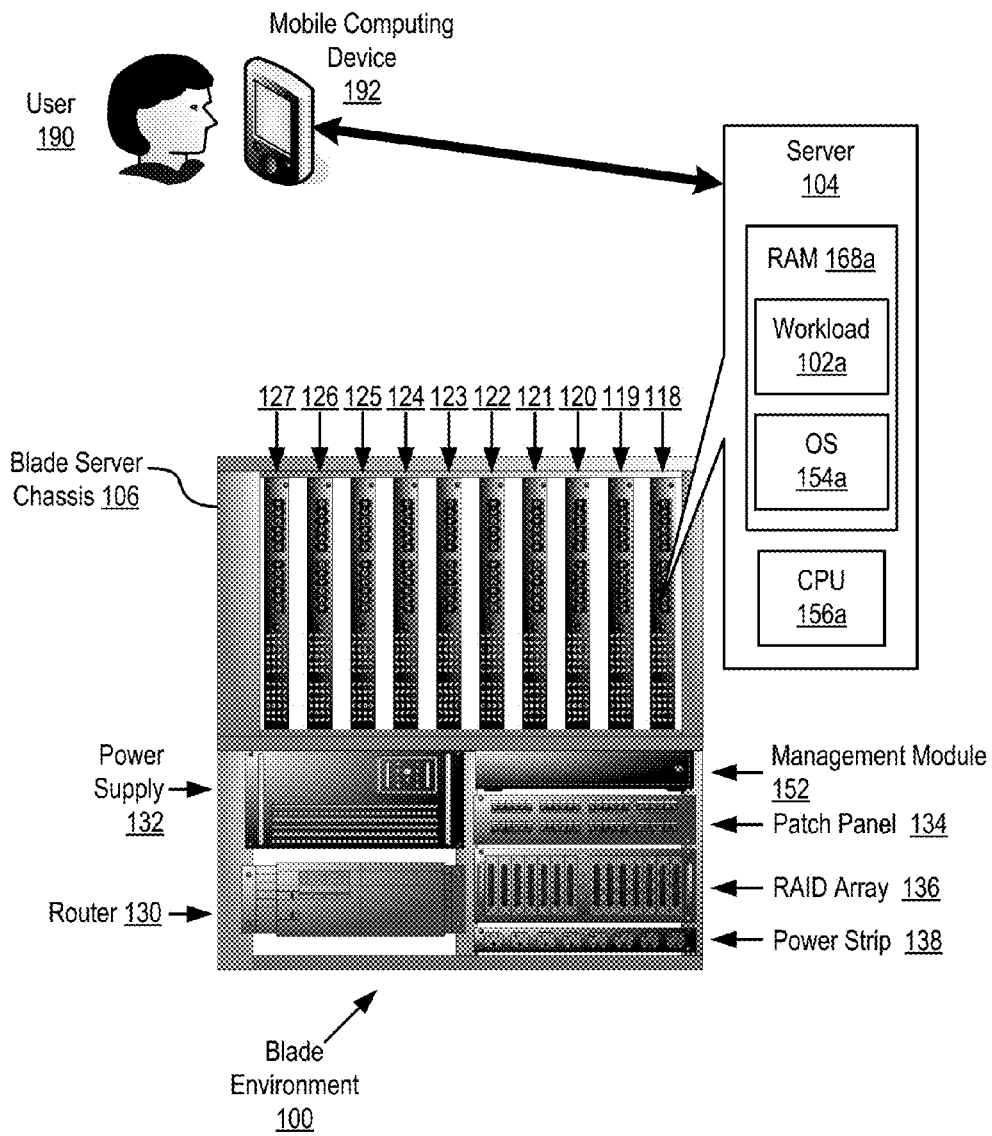
FIG. 1 sets forth a functional block diagram of an example data center that includes a blade environment configured for transferring workloads between computing devices according to embodiments of the present invention.

Example methods, apparatuses, and products for transferring workloads between computing devices in a distributed computing system in accordance with the present invention are described with reference to the accompanying drawings, beginning with FIG. 1. FIG. 1 sets forth a functional block diagram of an example data center that includes a blade environment (100) configured for transferring workloads between computing devices according to embodiments of the present invention. Examples of such blade environments may include the Blade System from HP, the BladeCenter® from Lenovo, and others as will occur to those of skill in the art.

The blade environment (100) in the example of FIG. 1 includes a blade server chassis (106) housing a number of blade servers (104, 118-127). A blade server chassis is an enclosure in which blade servers as well as other electrical components are installed. The chassis provides cooling for servers, data communications networking connections, input/output device connections, power connections, and so on as will occur to those of skill in the art. The blade server chassis can include blade slots, a shared media tray with an optical drive, floppy drive, and Universal Serial Bus ('USB') port, one or more management modules, two or more power supplies, two redundant high speed blowers, two slots for Gigabit Ethernet switches, and two slots for optional switch or pass-through modules such as Ethernet, Fibre Channel, InfiniBand or Myrient 2000 modules, and so on.

A server, as the term is used in this specification, refers generally to a multi-user computer that provides a service (e.g. database access, file transfer, remote access) or resources (e.g. file space) over a network connection. The term 'server,' as context requires, refers inclusively to the server's computer hardware as well as any server application software or operating system software running on the server. A server application is an application program that accepts connections in order to service requests from users by sending back responses. A server application can run on the same computer as the client application using it, or a server application can accept connections through a computer network. Examples of server applications include file server, database server, backup server, print server, mail server, web server, File Transfer Protocol ('FTP') servers, application servers, Virtual Private Network ('VPN') servers, Domain Host Configuration ('DHCP') servers, Domain Name System ('DNS') servers, Windows Internal Name Service ('WINS') servers, logon servers, security servers, domain controllers, backup domain controllers, proxy servers, firewalls, and so on.

Blade servers are self-contained servers, designed for high density. As a practical matter, all computers are implemented with electrical components requiring power that produces heat. Components such as processors, memory, hard drives, power supplies, storage and network connections, keyboards, video components, a mouse, and so on, merely support the basic computing function, yet they all add bulk, heat, complexity, and moving parts that are more prone to failure than solid-state components. In the blade paradigm, most of these functions are removed from the blade computer, being either provided by the blade server chassis (DC power) virtualized (iSCSI storage, remote console over IP), or discarded entirely (serial ports). The blade itself becomes simpler, smaller, and amenable to dense installation with many blade servers in a single blade server chassis.

Each blade server (104, 118-127) can include primary memory, such as Random Access Memory ('RAM') (168a), one or more CPUs (156a), communications adapters and communications ports, and the like. Each blade server (104, 118-127) in the example depicted in FIG. 1 is executing a workload (102a) as well as an operating system (154a). In addition to the blade servers (104, 118-127), the blade server chassis (106) in the example of FIG. 1 also house several other electrical components including a power supply (132), a data communications router (130), a patch panel (134) a Redundant Array of Independent Disks ('RAID') array (136), a power strip (138) and a management module (152).

The management module (152) is an aggregation of computer hardware and software that is installed in a blade environment (100) to provide support services for computing devices, such the blade servers (104, 118-127) of FIG. 1. Support services provided by the management module (152) include monitoring health of computing devices and reporting health statistics to a system management server, power management and power control, save and restore configurations, discovery of available computing devices, event log management, memory management, and so on. An example of a management module that can be adapted for use in systems configured for server failover according to embodiments of the present invention is Lenovo's Advanced Management Module ('AMM').

The example depicted in FIG. 1 also includes a mobile computing device (192) and a user (190) of the mobile computing device (192). The mobile computing device (192) of FIG. 1 may be embodied as a smartphone, tablet computer, or other type of mobile device that may be configured to communicate with the management module (152) over one or more data communications networks. The mobile computing device (192) of FIG. 1 may further be configured to communicate with the blade servers (104, 118-127) using proximity-based data communications technologies such as, for example, near field communication ('NFC') technologies. The user (190) of the mobile computing device (192) may be, for example, a system administrator that maintains the blade environment (100).

The mobile computing device (192) may be configured for use in transferring workloads between computing devices (e.g., the blade servers) in a distributed computing system (e.g., the blade environment) by: receiving, via a proximity-based communications protocol, a first computing device identity; receiving information describing one or more workloads executing on the first computing device; identifying a second computing device in the distributed computing system that is capable of executing at least a portion of the one or more workloads executing on the first computing device; and initiating a transfer of at least a portion of the one or more workloads executing on the first computing device to the second computing device, as explained in greater detail below.

The arrangement of servers and other devices making up the exemplary system illustrated in FIG. 1 are for explanation, not for limitation. Furthermore, although the system depicted in FIG. 1 illustrates an embodiment where workloads are transferred between blade servers (104, 118-127) in a blade environment (100), readers will appreciate that workloads may be transferred between many other types of computing devices in accordance with embodiments of the present invention. For example, workloads may be transferred between rack-mounted servers, tower servers, ultra-dense servers, and so on.

Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 1.

Transferring workloads between computing devices in a distributed computing system in accordance with the present invention is generally implemented with computers, that is, with automated computing machinery. In the system of FIG. 1, for example, the blade servers (104, 118-127) and mobile computing device (192) are implemented to some extent at least as computers. For further explanation, therefore, FIG. 2 sets forth a block diagram of automated computing machinery comprising an example computer (252) useful in transferring workloads between computing devices in a distributed computing system according to embodiments of the present invention. The example computer (252) depicted in FIG. 2 may be embodied, for example, as a mobile computing device such as a smartphone, as a mobile computing device such as a tablet computer, and so on.

Figure 2:
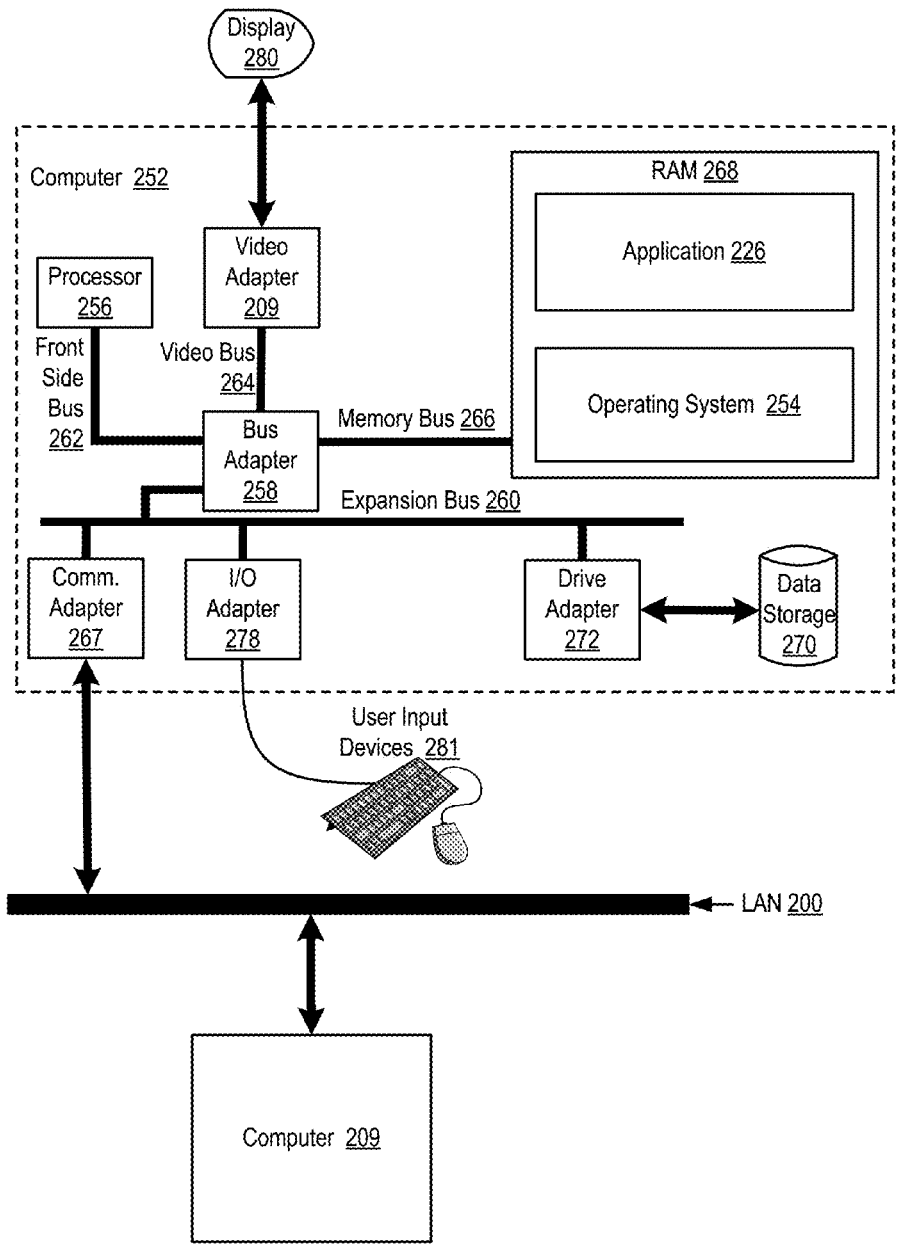
FIG. 2 sets forth a block diagram of automated computing machinery comprising an example computer useful in transferring workloads between computing devices in a distributed computing system according to embodiments of the present invention.

The computer (252) of FIG. 2 includes at least one computer processor (256) or 'CPU' as well as random access memory (268) ('RAM') which in this example is connected through a high speed memory bus (266) and bus adapter (258) to processor (256) and to other components of the computer (252). Stored in RAM (268) is an application (226), a module of computer program instructions useful in transferring workloads between computing devices in a distributed computing system according to embodiments of the present invention.

The application (226) depicted in FIG. 2 may be configured for use in transferring workloads between computing devices in a distributed computing system by: receiving, via a proximity-based communications protocol, a first computing device identity; receiving information describing one or more workloads executing on the first computing device; identifying a second computing device in the distributed computing system that is capable of executing at least a portion of the one or more workloads executing on the first computing device; and initiating a transfer of at least a portion of the one or more workloads executing on the first computing device to the second computing device, as explained in greater detail below.

Also stored in RAM (268) is an operating system (254). Operating systems useful transferring workloads between computing devices in a distributed computing system according to embodiments of the present invention include UNIX™, Linux™, Microsoft operating systems, Apple iOS, Android operating systems, and others as will occur to those of skill in the art. The operating system (254) and the application (226) in the example of FIG. 2 are shown in RAM (268), but many components of such software typically are stored in non-volatile memory also, such as, for example, on a disk drive (270), in a solid-state drive ('SSD'), and so on.

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for transferring workloads between computing devices in a distributed computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as a touchscreen display, a keypad, an attached keyboard, and so on. The example computer (252) of FIG. 2 includes a video adapter (209), which is an example of an I/O adapter specially designed for graphic output to a display device (280) such as a touchscreen display screen. Video adapter (209) is connected to processor (256) through a high speed video bus (264), bus adapter (258), and the front side bus (262), which is also a high speed bus.

The example computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for transferring workloads between computing devices in a distributed computing system according to embodiments of the present invention include, 802.11 adapters for wireless data communications network communications, adapters for communicating with telecommunications networks such as a Long-Term Evolution ('LTE') network, and so on.

Figure 3:
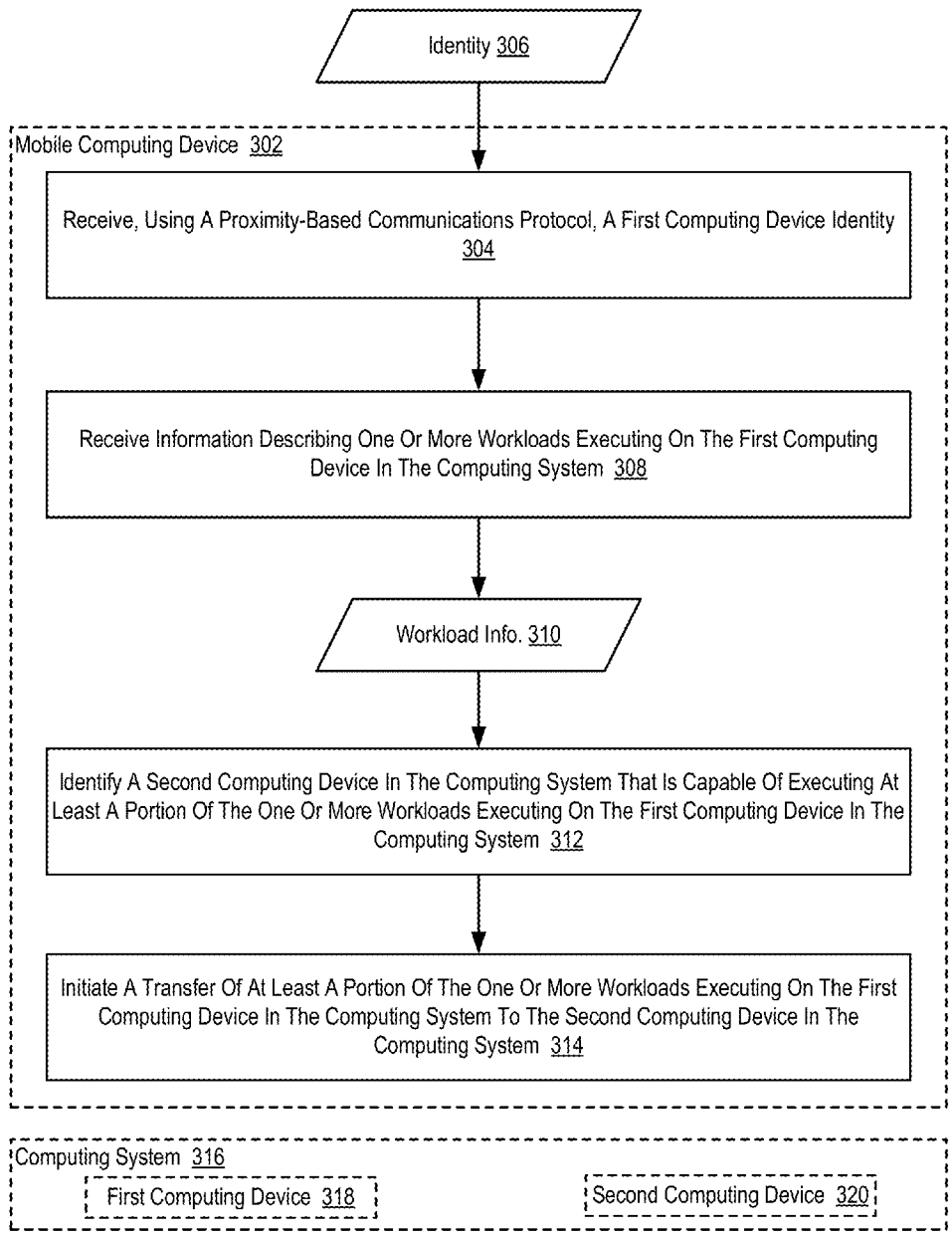
FIG. 3 sets forth a flow chart illustrating an example method for transferring workloads between computing devices in a distributed computing system according to embodiments of the present invention.

For further explanation, FIG. 3 sets forth a flow chart illustrating an example method for transferring workloads between computing devices (318, 320) in a distributed computing system (316) according to embodiments of the present invention. In the example method depicted in FIG. 3, a workload represents an amount of work to be performed by a particular computing device in a given period of time. Each computing device (318, 320) in the distributed computing system (316) may be assigned a particular workload and may need to transfer an assigned workload to another computing device, for example, if the computing device is about to fail. For example, the first computing device (318) may need to transfer a workload assigned to the first computing device (318) if it is determined that the first computing device (318) is about to fail and at risk of being unable to execute its assigned workload. Readers will appreciate that although the example depicted in FIG. 3 includes a distributed computing system (316) that includes only two computing devices (318, 320), embodiments are contemplated where the distributed computing system (316) can include hundreds, thousands, or more computing devices (318, 320).

The example method depicted in FIG. 3 is carried out, at least in part, by a mobile computing device (302). Such a mobile computing device (302) may be embodied, for example, as a smartphone, as a tablet computer, or other computing device. The mobile computing device (302) of FIG. 3 may be configured to communicate with other computing devices such as the first computing device (318), the second computing device (320), a computing device executing a system management module, and so on. Readers will appreciate that the mobile computing device (302) may be configured to communicate with other computing devices via a plurality of communications means. For example, the mobile computing device (302) may be configured to communicate with other computing devices directly through the use of NFC technologies, the mobile computing device (302) may be configured to communicate with other computing devices indirectly through the use of a data communications network, and so on.

The example method depicted in FIG. 3 includes receiving (304), by the mobile computing device (302) via a proximity-based communications protocol, a first computing device (318) identity (306). The first computing device (318) identity (306) may include a unique identifier for the first computing device (318) that distinguishes the first computing device (318) from all other computing devices in the distributed computing system (316). Readers will appreciate that the first computing device (318) identity (306) can also include, for example, a location of the first computing device (318) in the distributed computing system (316) such as a network address or rack/slot numbers, a model number for the first computing device (318), a serial number for the first computing device (318), and so on.

In the example method depicted in FIG. 3, the first computing device (318) identity (306) is received (304) by the mobile computing device (302) via a proximity-based communications protocol. A proximity-based communications protocol may be embodied, for example, as an NFC communication protocol that is used by the mobile computing device (302) and the first computing device (318) to establish radio communication with each other by touching them together or bringing them into sufficient proximity. NFC protocols may be standardized by groups such as the International Organization for Standardization ('ISO'), the International Electrotechnical Commission ('IEC'), the European Computer Manufacturers Association ('ECMA'), and others. Examples of such NFC protocols can include protocols standardized in ECMA-340 and ISO/IEC 18092, protocols standardized in ECMA-352 and ISO/IEC 21481, and so on. Other examples of proximity-based communications protocols can include the Bluetooth™ wireless protocol standard, protocols for exchanging data between a radio-frequency identification ('RFID') tag and an RFID reader, and so on.

In the example method depicted in FIG. 3, the mobile computing device (302) receives (304) the first computing device (318) identity (306) without user input to the mobile computing device (302). That is, a user of the mobile computing device (302) need not input the first computing device (318) identity (306) via a touchscreen display, keyboard, or other interface for receiving user input. Instead, the mobile computing device (302) receives (304) the first computing device (318) identity (306) via a data exchange between the mobile computing device (302) and the first computing device (318) utilizing the proximity-based communications protocol. For example, a user may simply hold the mobile computing device (302) near the first computing device (316), at which point the first computing device (316) will transmit the information (306) identifying the first computing device (318) to the mobile computing device (302) using NFC technologies and protocols.

The example method depicted in FIG. 3 also includes receiving (308), by the mobile computing device (302), information (310) describing one or more workloads executing on the first computing device (318) in the distributed computing system (316). In the example method depicted in FIG. 3, each workload executing on the first computing device (318) represents an amount of work to be performed by the first computing device (318) in a given period of time. Such a workload may include processing instructions, memory access instructions, data transfer instructions, and so on. The information (310) describing one or more workloads executing on the first computing device (318) may include, for example, information describing the nature of the workload (e.g., processing workload, memory access workload), information describing the amount of resources required to execute the workload, information describing the time constraints for completing execution of the workload, information describing security credentials required to execute the workload, and so on. In such a way, the information (310) describing one or more workloads executing on the first computing device (318) may be utilized to determine which other computing devices in the distributed computing system (316) may be capable of executing the one or more workloads that are executing on the first computing device (318).

Readers will appreciate that the mobile computing device (302) may receive (308) information (310) describing one or more workloads executing on the first computing device (318) via different means than the mobile computing device (302) received (304) the first computing device (318) identity (306). That is, the mobile computing device (302) may receive (308) information (310) describing one or more workloads executing on the first computing device (318) via means other than the proximity-based communications protocol. For example, the mobile computing device (302) may be communicatively coupled to a system management module via a data communications network and may request the information (310) describing one or more workloads executing on the first computing device (318) in response to receiving (304) the first computing device (318) identity (306).

The example method depicted in FIG. 3 also includes identifying (312), by the mobile computing device (302), a second computing device (320) in the distributed computing system (316) that is capable of executing at least a portion of the one or more workloads executing on the first computing device (318) in the distributed computing system (316). Identifying (312) a second computing device (320) in the distributed computing system (316) that is capable of executing at least a portion of the one or more workloads executing on the first computing device (318) in the distributed computing system (316) may be carried out, for example, by identifying the computing resources required to execute at least a portion of the one or more workloads executing on the first computing device (318) and identifying those computing devices in the distributed computing system (316) that have the necessary computing resources required to execute at least a portion of the one or more workloads executing on the first computing device (318).

Readers will appreciate that although the mobile computing device (302) identifies (302) a second computing device (320) in the distributed computing system (316) that is capable of executing at least a portion of the one or more workloads executing on the first computing device (318), the mobile computing device (302) itself may not be responsible for determining whether a particular computing device possesses the computing resources needed to execute at least a portion of the one or more workloads executing on the first computing device (318). Such a determination may be made, for example, by a system management module that has access to information describing the computing resources available to other computing devices in the distributed computing system (316). In such an example, the mobile computing device (302) may identify (302) a second computing device (320) in the distributed computing system (316) that is capable of executing at least a portion of the one or more workloads executing on the first computing device (318) by receiving a message or other form of communication from the system management module that includes information identifying a second computing device (320) in the distributed computing system (316) that the system management module has determined to be capable of executing at least a portion of the one or more workloads that are executing on the first computing device (318).

The example method depicted in FIG. 3 also includes initiating (314), by the mobile computing device (302), a transfer of at least a portion of the one or more workloads that are executing on the first computing device (318) to the second computing device (320). The mobile computing device (302) may initiate (314) a transfer of at least a portion of the one or more workloads executing on the first computing device (318) to the second computing device (320) through the use of a user interface presented to the user of the mobile computing device (302). For example, the mobile computing device (302) may receive a message or other form of communication from a system management module that includes information identifying a plurality of computing devices in the distributed computing system (316) that the system management module has determined to be capable of executing at least a portion of the one or more workloads executing on the first computing device (318). In such an example, the plurality of computing devices in the distributed computing system (316) that the system management module has determined to be capable of executing at least a portion of the one or more workloads executing on the first computing device (318) may be presented to the user of the mobile computing device (302) as a selectable list of computing devices that at least a portion of the one or more workloads executing on the first computing device (318) may be transferred to via the system administration module. In such an example, the mobile computing device (302) may initiate (314) a transfer of at least a portion of the one or more workloads executing on the first computing device (318) to the second computing device (320) by receiving user input identifying a selected second computing device (320) and sending a message to the system management module requesting that the system management module transfer of at least a portion of the one or more workloads executing on the first computing device (318) to the second computing device (320).

Readers will appreciate that by implementing the steps described above, situations in which the distributed computing system includes a computing device that is rapidly failing can be more favorably resolved. Consider an example in which the distributed computing system is embodied as a data center that includes hundreds or thousands of servers. In such an example, a system administrator may notice smoke escaping from a particular server, an usual sound coming from a particular server, an illuminated indicator warning light on a particular server, a damaged (e.g., dented) frame on a particular server, an usual smell emanating from a particular server, or some other indication that a particular server may be failing. Through the use of a mobile computing device, servers, and system management module such as those described above, a system administrator can simply bring their mobile computing device within close proximity of the failing server, at which point the mobile computing device can receive information identifying the failing server via a proximity-based communications protocol.

In such an example, the mobile computing device may be configured to communicate with a system management module and send a message to the system management module indicating that the workloads executing on the failing server need to be moved to another server. As such, the system management module may identify candidate servers for receiving the workloads executing on the failing server and the system management module may send a message to the mobile computing device identifying the candidate servers for receiving the workloads executing on the failing server. The mobile computing device may subsequently present the candidate servers to the user of the mobile computing device, at which point the user of the mobile computing device could provide user input identifying specific servers that are to receive the workloads executing on the failing server.

In such an example, the mobile computing device could initiate the transfer of the workloads from the failing server to the user-selected servers by sending a message to the system management module requesting that the system management module transfer the workloads from the failing server to the user-selected servers. Assuming that the user of the mobile computing device has provided the necessary administration credentials, the system management module could subsequently transfer the workloads executing on the failing blade server to the user-selected servers. In such a way, the system administrator would not be required to perform time-consuming tasks such as finding a system management console, logging into the system management console, attempting to identify the name and location of the failing server from the system management console, or other time-consuming tasks in the remaining time that the failing server is operational—thereby increasing the likelihood that workloads can be transferred from the failing server to another server before the failing server fails.

Readers will appreciate that although the examples described above include initiating (314) a transfer of a workload from a first computing device (318) to a second computing device (320), each computing device (318, 320) may utilizing virtualization technologies such that workloads are effectively transferred from a first virtual machine that is executing on the first computing device (318) to a second virtual machine that is executing on the second computing device (320).

Figure 4:
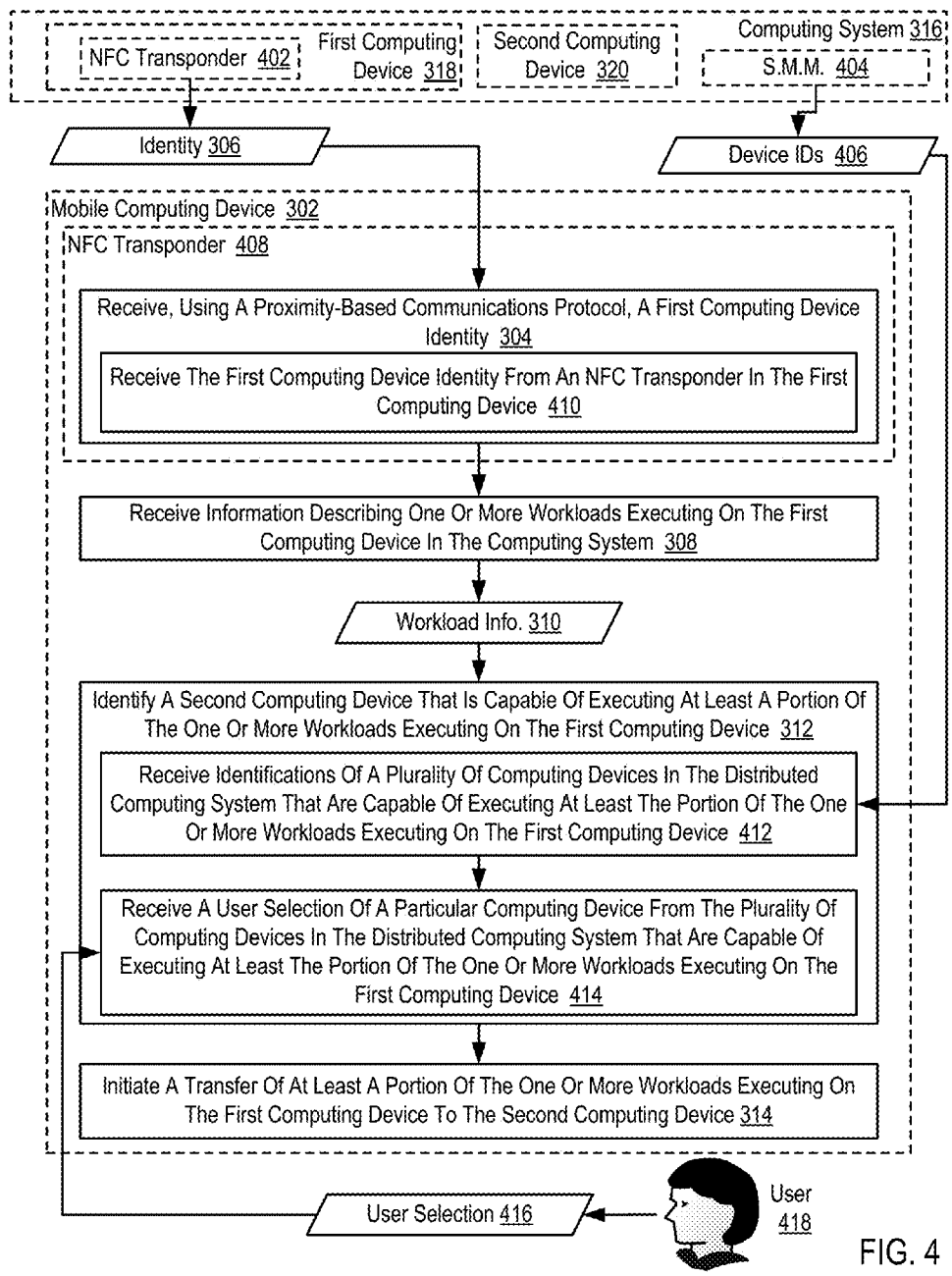
FIG. 4 sets forth a flow chart illustrating an additional example method for transferring workloads between computing devices in a distributed computing system according to embodiments of the present invention.

For further explanation, FIG. 4 sets forth a flow chart illustrating a further example method for transferring workloads between computing devices (318, 320) in a computing system (316) according to embodiments of the present invention. The example method depicted in FIG. 4 is similar to the example method depicted in FIG. 3, as the example method depicted in FIG. 4 also includes receiving (304), via a proximity-based communications protocol, the first computing device (318) identity (306), receiving (308) information (310) describing one or more workloads executing on the first computing device (318), identifying (312) a second computing device (320) in the distributed computing system (316) that is capable of executing at least a portion of the one or more workloads executing on the first computing device (318), and initiating (314) a transfer of at least a portion of the one or more workloads executing on the first computing device (318) to the second computing device (320).

In the example method depicted in FIG. 4, receiving (304) the first computing device (318) identity (306) can include receiving (410), via an NFC transponder (408) in the mobile computing device (302), the first computing device (318) identity (306) from an NFC transponder (402) in the first computing device (318). Each NFC transponder (402, 408) may be embodied as an NFC device that is embedded within the mobile computing device (302) or the first computing device (318). Such NFC devices can use electromagnetic induction between two loop antennas located within each other's near field, effectively forming an air-core transformer. The NFC transponder (402) in the first computing device (318) may be embodied, for example, as an NFC tag that contains data identifying the first computing device (318). In such an example, when the mobile computing device (302) is brought within sufficient proximity of the first computing device (318), the NFC transponder (408) in the mobile computing device (302) may read the data identifying the first computing device (318) from the NFC transponder (402) in the first computing device (318).

In the example method depicted in FIG. 4, identifying (312) a second computing device (320) in the distributed computing system (316) that is capable of executing at least a portion of the one or more workloads executing on the first computing device (318) can include receiving (412), by the mobile computing device (302), identifications (406) of a plurality of computing devices in the distributed computing system (316) that are capable of executing at least the portion of the one or more workloads executing on the first computing device (318). As described above, upon receiving (304) the first computing device (318) identity (306), the mobile computing device (302) may send the first computing device (318) identity (306) to a system management module (404). The system management module (404) may subsequently determine whether one or more other computing devices in the distributed computing system (316) possesses the computing resources needed to execute at least a portion of the one or more workloads executing on the first computing device (318). After identifying one or more other computing devices in the distributed computing system (316) that possesses the computing resources needed to execute at least a portion of the one or more workloads executing on the first computing device (318), the system management module (404) may communicate a list of available computing devices in the distributed computing system (316) that are capable of executing at least a portion of the one or more workloads executing on the first computing device (318) to the mobile computing device (302). In such a way, the mobile computing device (302) can receive (412) identifications (406) of a plurality of computing devices in the distributed computing system (316) that are capable of executing at least the portion of the one or more workloads executing on the first computing device (318) from the system management module (404).

In the example method depicted in FIG. 4, identifying (312) a second computing device (320) in the distributed computing system (316) that is capable of executing at least a portion of the one or more workloads executing on the first computing device (318) can also include receiving (414), by the mobile computing device (302), a user selection (416) of a particular computing device from the plurality of computing devices in the distributed computing system (316) that are capable of executing at least the portion of the one or more workloads executing on the first computing device (318). As described above, the mobile computing device (302) may present a list of available computing devices that are capable of executing at least a portion of the one or more workloads executing on the first computing device (318) to a user (418) of the mobile computing device (302) via a user interface of the mobile computing device (302), such as a touchscreen display. As such, the mobile computing device (302) may receive (414) a user selection (416) of a particular computing device from the plurality of computing devices in the distributed computing system (316) that are capable of executing at least the portion of the one or more workloads executing on the first computing device (318) via such a touchscreen display.

Figure 5:
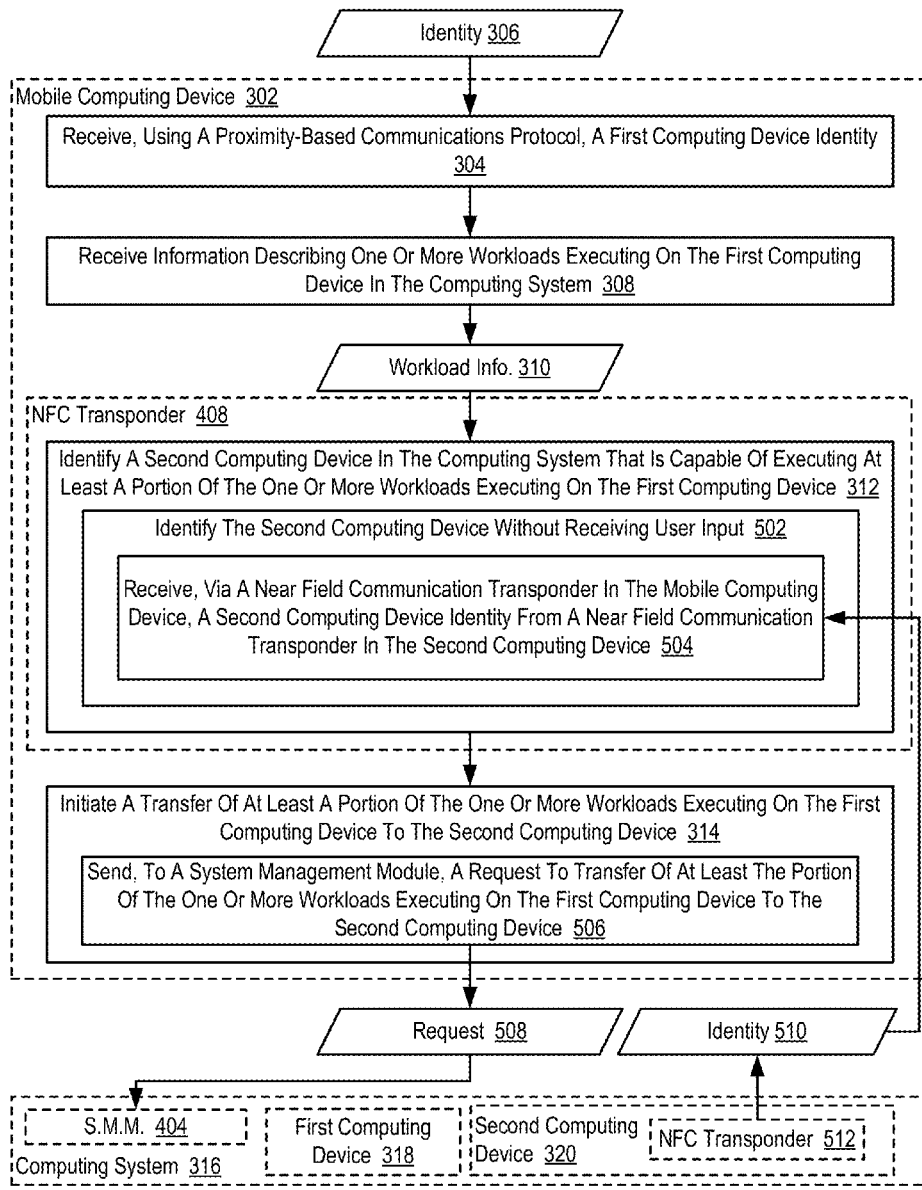
FIG. 5 sets forth a flow chart illustrating an additional example method for transferring workloads between computing devices in a distributed computing system according to embodiments of the present invention.

For further explanation, FIG. 5 sets forth a flow chart illustrating a further example method for transferring workloads between computing devices (318, 320) in a computing system (316) according to embodiments of the present invention. The example method depicted in FIG. 5 is similar to the example method depicted in FIG. 3, as the example method depicted in FIG. 5 also includes receiving (304), via a proximity-based communications protocol, a first computing device (318) identity (306), receiving (308) information (310) describing one or more workloads executing on the first computing device (318), identifying (312) a second computing device (320) in the distributed computing system (316) that is capable of executing at least a portion of the one or more workloads executing on the first computing device (318), and initiating (314) a transfer of at least a portion of the one or more workloads executing on the first computing device (318) to the second computing device (320).

In the example method depicted in FIG. 5, identifying (312) a second computing device (320) in the distributed computing system (316) that is capable of executing at least a portion of the one or more workloads executing on the first computing device (318) can include identifying (502) the second computing device without receiving user input. Identifying (502) the second computing device without receiving user input may be carried out, for example, by receiving (504), via an NFC transponder (408) in the mobile computing device (302), a second computing device (320) identity (510) from an NFC transponder (512) in the second computing device (320). Each NFC transponder (408, 512) may be embodied as an NFC device that is embedded within the mobile computing device (302) or the second computing device (320). Such NFC devices can use electromagnetic induction between two loop antennas located within each other's near field, effectively forming an air-core transformer. The NFC transponder (512) in the second computing device (320) may be embodied, for example, as an NFC tag that contains data identifying the second computing device (320). In such an example, when the mobile computing device (302) is brought within sufficient proximity of the second computing device (320), the NFC transponder (408) in the mobile computing device (302) may read the data identifying the second computing device (320) from the NFC transponder (512) in the second computing device (320).

In the example method depicted in FIG. 5, initiating (314) a transfer of at least a portion of the one or more workloads executing on the first computing device (318) to the second computing device (320) can include sending (506), to a system management module (404), a request (508) to transfer of at least the portion of the one or more workloads executing on the first computing device (318) to the second computing device (320). The request (508) to transfer of at least the portion of the one or more workloads executing on the first computing device (318) to the second computing device (320) may be embodied, for example, as a message sent from the mobile computing device (302) to the system management module (404) over a data communications network such as an IP network. In such an example, the mobile computing device (302) may be equipped with a software application that, when executed, can exchange messages with the system management module (404), can present user interfaces to a user of the mobile computing device (302) (e.g., a user interface that presents a list of computing devices that are available to receive a particular workload), can receive user input, and so on.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a mobile computing device,
receiving, via a proximity-based communications protocol on the mobile computing device, a first computing device identity in a distributed computing system, wherein receiving comprises receiving, via a near field communication transponder in the mobile computing device, the first computing device identity from a near field communication transponder in the first computing device;
identifying a second computing device in the distributed computing system that is capable of executing at least a portion of one or more workloads executing on the first computing device, wherein the identified second computing device is already installed and operating, wherein identifying the second computing device that is capable of executing at least the portion of the one or more workloads executing on the first computing device further comprises:
   receiving identifications of a plurality of computing devices in the distributed computing system that are capable of executing at least the portion of the one or more workloads executing on the first computing device, and
   receiving a user selection of a particular computing device from the plurality of computing devices in the distributed computing system that are capable of executing at least the portion of the one or more workloads executing on the first computing device; and
initiating a transfer of at least a portion of the one or more workloads executing on the first computing device to the identified second computing device without transferring any portion of the workload to or from the mobile computing device, wherein initiating a transfer of at least a portion of the one or more workloads executing on the first computing device to the identified second computing device further comprises sending, to a system management module, a request to transfer of at least the portion of the one or more workloads executing on the first computing device to the identified second computing device.

2. The method of claim 1 wherein the first computing device identity is received without user input to the mobile computing device.

3. An apparatus, the apparatus comprising a computer processor and a computer memory operatively coupled to the computer processor, the computer memory storing computer program instructions that, when executed by the computer processor, cause a mobile computing device to carry out steps of:
  receiving, via a proximity-based communications protocol on the mobile computing device, a first computing device identity in a distributed computing system, wherein receiving comprises receiving, via a near field communication transponder in the mobile computing device, the first computing device identity from a near field communication transponder in the first computing device;
  identifying a second computing device in the distributed computing system that is capable of executing at least a portion of one or more workloads executing on the first computing device, wherein the identified second computing device is already installed and operating, wherein identifying the second computing device that is capable of executing at least the portion of the one or more workloads executing on the first computing device further comprises:
    receiving identifications of a plurality of computing devices in the distributed computing system that are capable of executing at least the portion of the one or more workloads executing on the first computing device, and
    receiving a user selection of a particular computing device from the plurality of computing devices in the distributed computing system that are capable of executing at least the portion of the one or more workloads executing on the first computing device; and
  initiating a transfer of at least a portion of the one or more workloads executing on the first computing device to the identified second computing device without transferring any portion of the workload to or from the mobile computing device, wherein initiating a transfer of at least a portion of the one or more workloads executing on the first computing device to the identified second computing device further comprises sending, to a system management module, a request to transfer of at least the portion of the one or more workloads executing on the first computing device to the identified second computing device.

4. The apparatus of claim 3 wherein the first computing device identity is received without user input to the mobile computing device.

5. A computer program product, the computer program product disposed upon a computer readable medium, wherein the computer readable medium is not a signal, the computer program product comprising computer program instructions that, when executed, cause a mobile computing device to carry out steps of:
  receiving, via a proximity-based communications protocol on the mobile computing device, a first computing device identity in a distributed computing system, wherein receiving comprises receiving, via a near field communication transponder in the mobile computing device, the first computing device identity from a near field communication transponder in the first computing device;
  identifying a second computing device in the distributed computing system that is capable of executing at least a portion of one or more workloads executing on the first computing device, wherein the identified second computing device is already installed and operating, wherein identifying the second computing device that is capable of executing at least the portion of the one or more workloads executing on the first computing device further comprises:
    receiving identifications of a plurality of computing devices in the distributed computing system that are capable of executing at least the portion of the one or more workloads executing on the first computing device, and
    receiving a user selection of a particular computing device from the plurality of computing devices in the distributed computing system that are capable of executing at least the portion of the one or more workloads executing on the first computing device; and
  initiating a transfer of at least a portion of the one or more workloads executing on the first computing device to the identified second computing device without transferring any portion of the workload to or from the mobile computing device, wherein initiating a transfer of at least a portion of the one or more workloads executing on the first computing device to the identified second computing device further comprises sending, to a system management module, a request to transfer of at least the portion of the one or more workloads executing on the first computing device to the identified second computing device.

6. The product of claim 5 wherein the first computing device identity is received without user input to the mobile computing device.

* * * * *